United States Patent [19]
Frietsch

[11] Patent Number: 5,189,278
[45] Date of Patent: Feb. 23, 1993

[54] METHOD FOR EDGE ROUNDING OF SPRINGS

[75] Inventor: Klaus Frietsch, Schramberg, Fed. Rep. of Germany

[73] Assignee: Hugo Kern & Liebers GmbH & Co. Platinen- und Federnfabrik, Schramberg, Fed. Rep. of Germany

[21] Appl. No.: 722,000

[22] Filed: Jun. 27, 1991

[30] Foreign Application Priority Data

Jun. 29, 1990 [DE] Fed. Rep. of Germany ....... 4020700

[51] Int. Cl.$^5$ .......................................... B23K 26/00
[52] U.S. Cl. ................................................ 219/121.66
[58] Field of Search .................. 219/121.16, 121.17, 219/121.37, 121.38, 121.65, 121.66

[56] References Cited

U.S. PATENT DOCUMENTS

| | | | |
|---|---|---|---|
| 3,718,968 | 3/1973 | Sims et al. | 219/121.66 |
| 4,147,570 | 4/1979 | Carbo et al. | 219/121.85 X |
| 4,151,014 | 4/1979 | Charschan et al. | 219/121.85 X |
| 4,159,686 | 7/1979 | Heim | 219/121.85 X |
| 4,256,948 | 3/1981 | Wolf et al. | 219/121.65 |
| 4,300,474 | 11/1981 | Livsey | 219/121.63 X |
| 4,756,878 | 7/1988 | King et al. | 219/121.66 X |

Primary Examiner—C. L. Albritton
Attorney, Agent, or Firm—Lackenbach Siegel Marzullo & Aronson

[57] ABSTRACT

A method for the edge rounding of springs is characterized in that the springs are heated with a laser beam until the desired edge rounding is obtained by softening or, respectively, fusing of the surface, whereupon the heating process is terminated. The method can be advantageously used for the edge rounding of stamping burrs, which were generated during the production of microsliding contacts by stamping. Advantageously the laser beam defocused i.e. focused to a point in front of or behind of the surface to be irradiated, whereby a soft radiation results. By avoiding a mechanical post-processing and with the contactless treatment, a particularly high surface quality can be achieved.

6 Claims, 1 Drawing Sheet

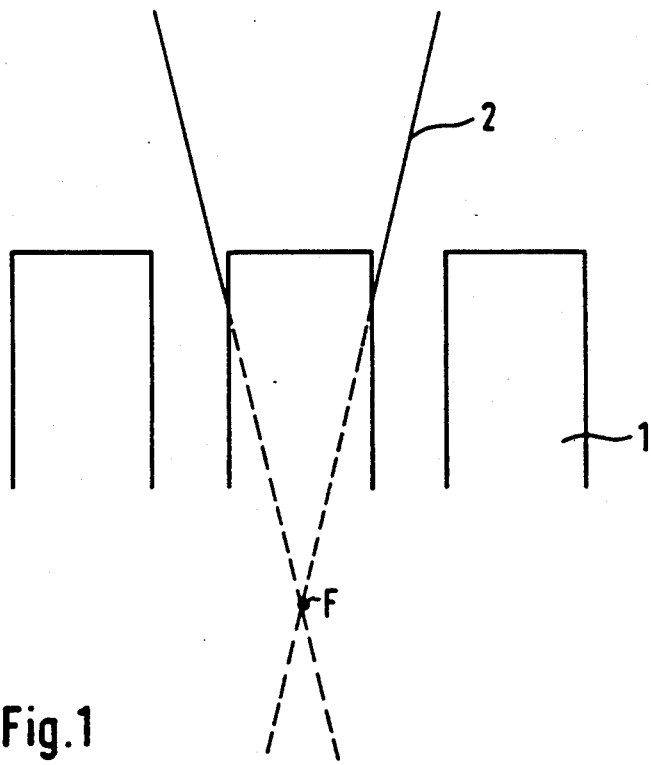
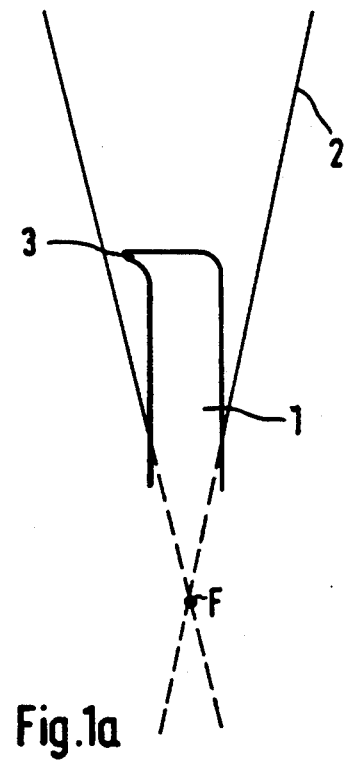
Fig.1      Fig.1a
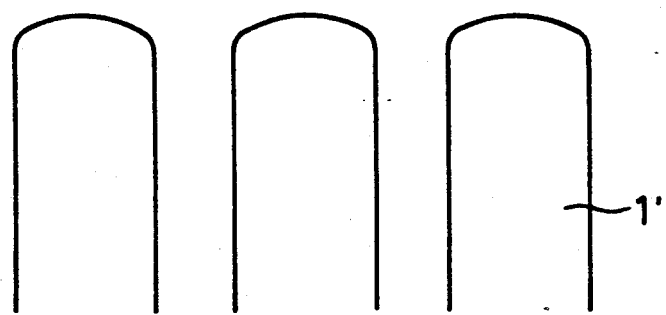
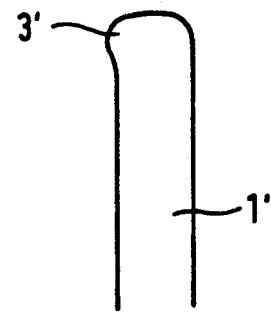
Fig.2      Fig.2a

METHOD FOR EDGE ROUNDING OF SPRINGS

The Invention relates to a method for edge rounding of springs.

In the production of springs, for example, by stamping their generated edges develop stamping burrs. Such edges or stamping burrs have to be rounded off prior to the use of the spring. Conventionally, the edges have been processed by mechanical polishing.

If the springs are parts of microsliding contacts, which are used for precision potentiometers, low bounce switches, and the like, then a complete bundle of springs has to be polished, where the springs are disposed at close distances next to each other. In this context about five or more springs can be disposed per millimeter.

The springs of microsliding contact are stamped from bands by precision stamping. The bands are then cut into strips with in each case the desired number of continuous connected springs. For the subsequent deburring the strips are clamped between holding devices, such, that the stamping edges on the spring ends can be reworked with the help of a polishing disc with the aid of polishing paste.

The clamping, processing and the following cleaning alone are very time and labor intensive and therefore expensive. In addition, continuous production of the stamped strips withdrawn from a band is not possible. Furthermore, the joint mechanical polishing of a plurality of springs of a strip is only possible from one side such that nevertheless sharp edges or burrs can remain at the faces disposed remote to the polishing disc. Finally, based on the complicated handling, the danger exists that individual springs of a strip may become deformed.

It is an object of the present invention to furnish a method which allows one to provide an edge rounding of springs in a time and expense saving way, wherein simultaneously a high surface quality of the springs is assured.

According to the invention this object is achieved by heating each spring with a laser beam until the desired edge rounding occurs by softening or, respectively, fusing of the surface whereupon the heating process is terminated.

The subclaims refer to the advantageous further development of a method or, respectively, to a device for performing the method.

The processing with aid of a laser beam is associated with substantial time and cost advantages as compared with the conventional methods. Since the method can be easily automized the post-processing of springs can also be performed continuously or, respectively, cyclically. Because of the short-term softening and, respectively, remelting of the edges to be rounded at the surface there will be created a particularly soft rounded, metallic shiny surface. In particular, if the springs represents the contact tongues of microsliding contacts, then there will be achieved a particularly favorable contact shape with a slightly rounded, broad contact face. The degree of the edge rounding can therefore be desirably controlled by the intensity and the duration of the laser irradiation. Furthermore, an excellect surface quality can be achieved since no polishing paste is employed and thus grinding traces and residues of polishing paste or cleaning agents are avoided. Similarly, the damages of springs are avoided since the method works contactless.

According to an advantageous further embodiment of the invention the laser beam is focused at a point in front or behind the respective surface to be processed. The thus defocused laser beam furnishes a "soft" radiation such that the laser light does not act in the depth and only the edges are fused. This allows one to tolerate deviations in the positioning of the springs, which can be caused, for example, by positional tolerances of the springs.

Intensity and duration of the laser irradiation can be controlled such, based on a further advantageous embodiment of the invention, that the springs are at least partially hardened at their surface. Thus, achievable partial surface hardening is, of course, dependent on the kind of the spring material, on the preceding heat treatment, and the like.

In addition, it is even possible to feed alloying additives to the surface of the spring, which alloying additives combine during the radiation with the surface material whereby special properties such as a particular hardness, wear resistance or good electrical conductivity of the spring surface are achieved. The feeding of the alloying additives can be performed advantageously instead mechanically, such as by a deposition from the gaseous phase.

Both, a pulse laser as well as a continuous wave laser can be employed in a device for the performance of the method. While the employment of a pulse laser requires the cyclical irradiation of the springs, the springs can be continuously passed through the laser beam with the use of a continuous wave laser. On the other hand, springs can be continuously passed through the laser beam in case of the use of a continuous wave laser.

Advantages and mode of operation of the method are illustrated in the following based on the drawings. The drawings show in a schematical representation:

FIG. 1 a front view of several springs prior to the processing,

FIG. 1a a side view of a spring prior to the processing,

FIG. 2 a front view of the spring according to FIG. 1 after the processing, and

FIG. 2a a side view of the spring according to FIG. 1a after the processing.

Three springs 1 are schematically illustrated in FIG. 1, where the spring represent the contact tongues of a microsliding contact. The edge to be rounded can be recognized in the side view, according to FIG. 1a at the protruding end of the spring, which was generated as a stamping 3 burr during the production by stamping.

The laser beam indicated by the reference numeral 2 is focused toward a point F behind the surface to be irradiated in each case. A "soft" radiation results based on the such defocused laser beam so that local overheating can be avoided. The result of the processing can be recognized from FIGS. 2 or, respectively, 2a. The ends of the springs 1' are soft rounded and a onesided slightly outwardly protuding bulge 3' is generated out of the originally sharp-edged stamping burr, which exhibits a particularly favorable shape for the use as an electrical contact surface.

I claim:

1. A method for the edge rounding of springs in a spring bundle or a plurality of juxtaposed springs, each having stamping burrs or the like, comprising the steps of heating each spring of a bundle or strip of springs with a laser beam until a desired edge rounding is obtained by softening or fusing each spring surface, and thereafter terminating the heating step, and controlling said heating step of focusing said laser beam at a point in front of or behind the surface of each spring being processed, whereby said springs form contact tongues of microsliding contacts, and are processed continuously or cyclically through said laser beam, and wherein said laser beam is generated by a pulse laser or a continuous wave laser.

2. Method according to claim 1, wherein a spring bundle comprises five or more springs per millimeter.

3. Method according to claim 1, wherein said edge rounding is further controlled by the intensity and duration of said laser beam such that the spring will be at least be partially hardened at its surface.

4. Method according to claim 3, wherein one or more alloying additives are fed to the surface of the spring during the heating step.

5. Method according to claim 4, wherein the alloying additives are applied by depositing from a gaseous phase to the heated surface of said spring.

6. Method according to claim 1, wherein each spring is a stamping.

* * * * *